US007558990B2

(12) United States Patent
Tsuyuno et al.

(10) Patent No.: US 7,558,990 B2
(45) Date of Patent: Jul. 7, 2009

(54) SEMICONDUCTOR CIRCUIT DEVICE AND METHOD OF DETECTING RUNAWAY

(75) Inventors: Kimitake Tsuyuno, Kawasaki (JP); Masashi Tsubota, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 538 days.

(21) Appl. No.: 11/214,977

(22) Filed: Aug. 31, 2005

(65) Prior Publication Data

US 2006/0053350 A1    Mar. 9, 2006

(30) Foreign Application Priority Data

Sep. 8, 2004    (JP) .............................. 2004-260519

(51) Int. Cl.
*G06F 11/00*    (2006.01)
(52) U.S. Cl. ....................................................... 714/53
(58) Field of Classification Search .................... 714/53
See application file for complete search history.

(56) References Cited

U.S. PATENT DOCUMENTS

| 4,584,666 | A | * | 4/1986 | Zolnowsky et al. ........... 714/53 |
| 4,815,025 | A | * | 3/1989 | Ossfeldt et al. ............... 714/53 |
| 5,564,030 | A | * | 10/1996 | Whitted et al. .............. 711/201 |
| 5,579,508 | A | * | 11/1996 | Yoshizawa et al. .......... 711/172 |
| 6,047,388 | A | * | 4/2000 | Bashore et al. ................ 714/38 |
| 6,049,876 | A | * | 4/2000 | Moughanni et al. ........... 726/26 |
| 6,745,346 | B2 | * | 6/2004 | Quach et al. ................... 714/42 |
| 6,859,897 | B2 | * | 2/2005 | Swoboda ....................... 714/53 |
| 7,117,398 | B2 | * | 10/2006 | Flores et al. ................... 714/53 |
| 7,165,018 | B2 | * | 1/2007 | Flores et al. ................... 703/23 |
| 2003/0028696 | A1 | * | 2/2003 | Catherwood et al. ........ 710/260 |
| 2005/0027973 | A1 | * | 2/2005 | Barry et al. .................. 712/233 |
| 2005/0283770 | A1 | * | 12/2005 | Karp et al. .................... 717/151 |

FOREIGN PATENT DOCUMENTS

JP    2004-151846    5/2004

OTHER PUBLICATIONS

Microsoft Computer Dictionary, Fifth Edition, 2002, Microsoft Press, p. 285.*

* cited by examiner

*Primary Examiner*—Robert Beausoliel
*Assistant Examiner*—Amine Riad
(74) *Attorney, Agent, or Firm*—Young & Thompson

(57) ABSTRACT

In an embodiment of the invention, if a microprocessor detects runaway of a CPU executing a program, it starts a recovery program. The runaway in the program execution is detected by monitoring accesses a non-implementation space in a program space. If the CPU accesses any address in the non-implementation space, the microprocessor sends an instruction to the CPU to execute a predetermined recovery program. Thereby, the microprocessor can detect and stop the runaway into the non-implementation space.

13 Claims, 8 Drawing Sheets

SEMICONDUCTOR CIRCUIT DEVICE AND METHOD OF DETECTING RUNAWAY

BACKGROUND OF THE INVENTION

1. Field of the Invention

The present invention relates to a semiconductor circuit device and a method of detecting runaway, more particularly relates to detection of runaway into a non-implementation space of a processor in the program execution.

2. Description of the Related Art

Recently, microprocessors are used in controllers of many kinds of electronic devices such as home electronic products, office automation equipment, vehicles and manufacturing apparatus as well as computer systems such as personal computers. A microprocessor has a control section which reads out data including instructions and addresses to control the entire microprocessor according to the command execution. The microprocessor further comprises an arithmetic section which executes an arithmetic operation and a logical operation, a register set which stores necessary data, and the like. Further, if the microprocessor is implemented as a controller of any kind of equipment, it may be equipped with memories such as a ROM and a RAM and other peripheral functions. The microprocessor decodes and processes sequentially instructions contained in a program so that a desired function is attained.

An instruction is fetched from an address indicated by a program counter in the register set. It is known that if a value of the program counter changes due to external noise, for example, the microprocessor might access to an unintended address and run away in the program execution. Thus, it is needed that the runaway should be automatically detected and a recovery process for the runaway should be started. Some methods for detecting runaway have been proposed. For example, one approach uses TRAP instructions located at dispersed addresses in a program stored in a ROM so that the TRAP process causes the recovery program to start.

Japanese Unexamined Patent Publication No. 2004-151846 discloses a method for detecting the runaway of a microprocessor. The microprocessor disclosed therein comprises a runaway detecting counter which works all the time. If the runaway detecting counter overflows, it determines that runway occurs and puts out an abnormal signal to a CPU. Then, the microprocessor clears the runaway detecting counter at a predetermined timing during a normal operation. This causes the runaway detecting counter not to overflow but to detect the runaway which is different from the normal operation.

Specifically, the microprocessor monitors program execution addresses and clears the runaway detecting counter when it executes a registered predetermined address. The microprocessor also clears the runaway detecting counter if all factors of peripheral hardware of the microprocessor are operating properly. The hardware directly clears runaway detecting counter but not via software or program. Thus, the microprocessor can prevent clearing accidentally the runaway detecting counter during runaway in a program execution and can detect the runaway in program execution without fail.

Typically, a program space provided to a CPU includes an implementation space allocated to implemented hardware such as a ROM and a RAM, as well as a non-implementation space which is not associated with implemented hardware. Therefore, it has now been discovered that, in the above-described related art, the microprocessor using TRAP instructions in the program in the ROM cannot detect runaway into the non-implementation space where any program is not stored, as well as the microprocessor described in the above Patent Publication, which detects the normal program execution so as to clear the runaway detecting counter. Consequently, a method to detect runaway into the non-implementation space is required.

SUMMARY OF THE INVENTION

According to an aspect of the invention there is provided a semiconductor circuit device for detecting runaway of program .execution in a processor which comprises a processor executing a process according to a program and an address determination section determining an address of a program space accessed by the processor. A recovery process is carried out in response to the determination of the address determination section that the processor has accessed the address of the non-implementation space. Thus, runaway into the non-implementation space can be detected.

According to another aspect of the present invention, there is provided a runaway detection method for detecting runaway of program execution in a processor which carries out processes according to a program comprising determining an address of a program space accessed by the processor and carrying out a predetermined recovery process in response to a determination that the processor has accessed to the non-implementation space. Thus, runaway into the non-implementation space can be detected more certainly.

According to still another aspect of the invention, there is provided a semiconductor circuit device having a processor which carries out a process according to a program, and detecting runaway of program execution in a processor which comprises an address determination section determining an address in a non-implementation space which the processor has accessed, and an instruction section instructing the processor to invoke a predetermined program in response to a determination of the address determination section that the processor has accessed an address in a non-implementation space. This achieves detection of runaway into the non-implementation space and carrying out a recovery process corresponding to the runaway.

According to the present invention, runaway of program execution into the non-implementation space of the program space can be detected.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

The microprocessor in accordance with the present embodiment detects runaway in program execution of a processor, which is shown as a CPU in the present embodiment, and starts execution of a recovery program. Runaway in program execution can be detected by monitoring accesses a non-implementation space of a program space. If the CPU accesses any address in the non-implementation space, the microprocessor sends an instruction to the CPU to execute a predetermined recovery program. Thereby, it can detect and stop the runaway into the non-implementation space.

Figure 1:
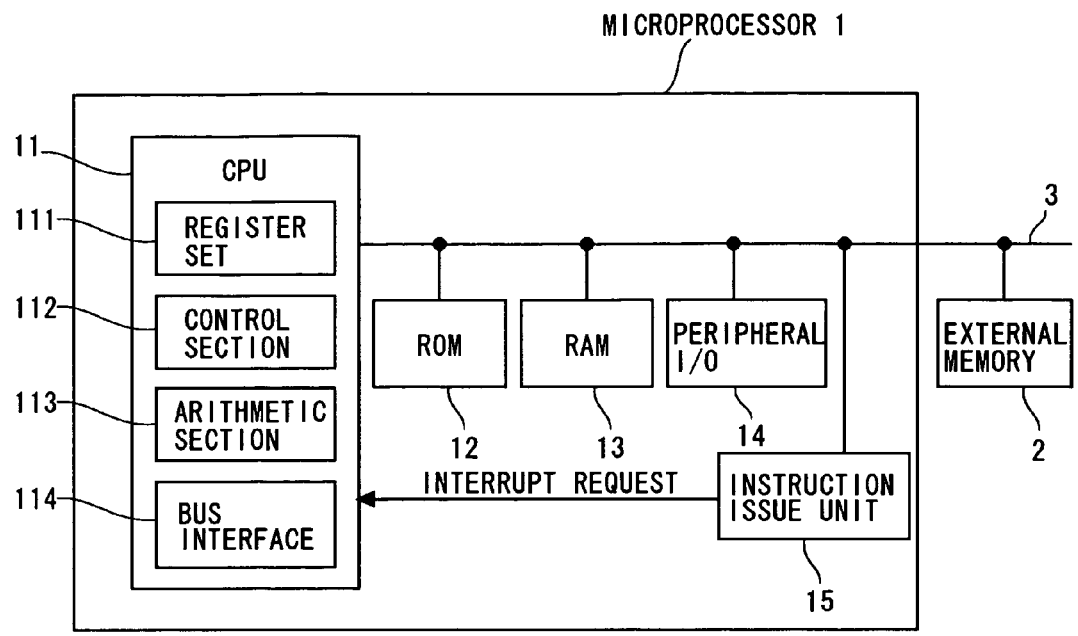
FIG. 1 is a block diagram schematically illustrating hardware configuration of the microprocessor according to the first embodiment.

Before describing details of the runaway detection of the present embodiment, hardware configuration of the microprocessor of the present embodiment will be described. FIG. 1 is a schematic block diagram showing the hardware configuration of the microprocessor 1 of the present embodiment. The microprocessor 1 is connected to an external circuit such as an external memory 2 via an external bus 3 and performs a desired process such as control process and arithmetic process through data input and output to and from the external circuit.

The microprocessor 1 comprises a CPU 11 which is an example of an instruction process section, a ROM 12 which is a read only memory, a RAM 13 which can read and write data at any given address, a peripheral I/O circuit 14 which interfaces input and output of data to and from peripheral circuits and an instruction issue unit 15 which issues a predetermined instruction to the CPU 11 if it detects runaway of the CPU 11. Circuits are connected via an internal bus and each circuit inputs and outputs data such as instruction, address and arithmetic data, via the internal bus. In addition, a dedicated bus corresponding to each data type is prepared.

The CPU 11 comprises circuits such as a register set 111, a control section 112, an arithmetic section 113 and a bus interface 114. The register set 111 consists of a plurality of registers and stores instructions, addresses and arithmetic data. The register set 111 includes an accumulator for storing arithmetic data and a program counter for indicating a program execution address, and the like.

The control section 112 comprises an instruction fetch circuit for fetching instructions from e.g. a ROM 12, an instruction decoder for decoding instructions, and the like. The control section 112 reads out data including instructions and addresses from the ROM 12 and the RAM 13 into registers and controls the entire microprocessor 1 according to results of performing instructions. Further, if it receives an interrupt request from the external circuit, it controls the interrupt process corresponding to the cause of the interrupt. The arithmetic section 113 performs arithmetic logical operation such as addition and subtraction, logical operation such as AND, OR and NOT, a shift command, and the like. The bus interface 114 interfaces input/output of instructions and data for the external circuit.

The ROM 12 stores instructions and arithmetic data set up by a user beforehand. A non-volatile memory, which can maintain the stored data even if the power supply is shut off, is used as the ROM 12, such as an EEPROM (Electrically Erasable Read-Only Memory) like a flush memory. The RAM 13 is a volatile memory device and may be an SRAM which does not need a refresh operation to maintain the stored data or a DRAM which needs refresh operations at regular intervals.

The instruction issue unit 15 detects runaway of program execution in the CPU 11 and instructs the CPU 11 to execute a predetermined program if it detects the runaway. Specifically, the instruction issue unit 15 detects instruction fetch addresses of the CPU 11 and it instructs the CPU 11 to execute a recovery program if an instruction is fetched from any address of the non-implementation space. A principle of runaway detection by the instruction issue unit 15 will be described below using a memory map of the program space of the CPU 11, i.e., an address space provided to the CPU 11.

Figure 2:
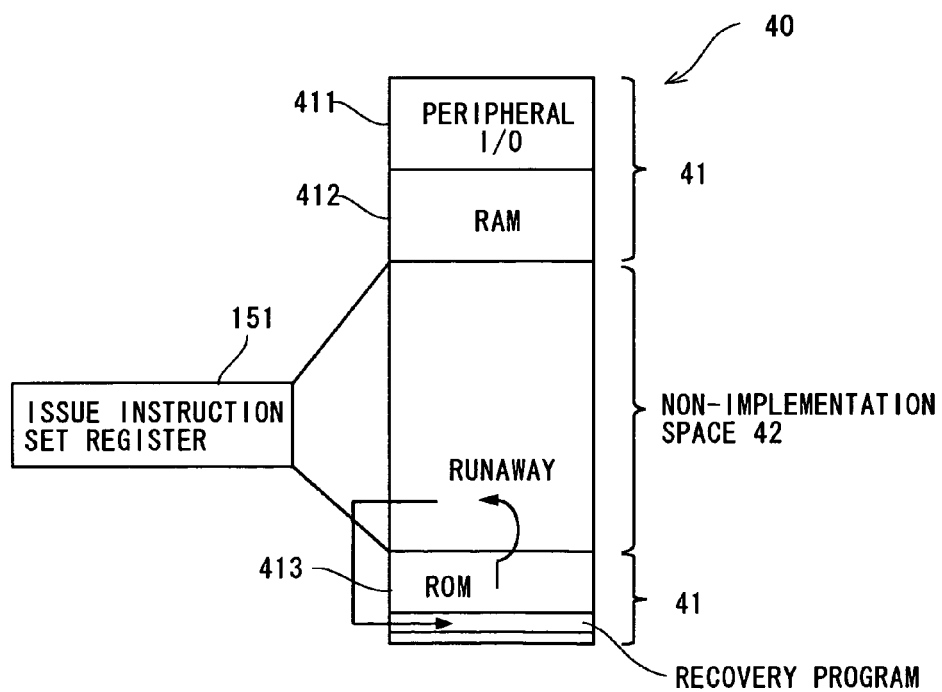
FIG. 2 is a drawing illustrating the mapping of the program space of the CPU and runaway detection by the instruction issue unit according to the first embodiment.

FIG. 2 illustrates the mapping of program space of the CPU 11 and runaway detection by the instruction issue unit 15. A program space 40 is divided into some segments. Each segment is categorized into an implementation space 41 which is allocated to hardware implemented in the microprocessor 1 or in an external circuit, or a non-implementation space 42 to which corresponding hardware is not implemented. The implementation space 41 contains a plurality of segments each of which corresponds to a unique hardware section. In FIG. 2, a peripheral I/O space 411, a RAM space 412 and a ROM space 413 are exemplified.

The instruction issue unit 15 includes an issue instruction set register 151, which prestores instructions. For example, a JUMP instruction or a TRAP instruction can be set in the issue instruction set register 151. The issue instruction set register 151 enables a user to set a desired instruction. The JUMP instruction or the TRAP instruction invokes a predetermined program, preferably a recovery program.

If the program execution of the CPU 11 runs away and the CPU 11 accesses the non-implementation space 42, the instruction from the issue instruction set register 151 is put into the CPU 11. As described above, the issue instruction set register 151 is allocated to all of the addresses of the non-implementation space 42 so that the instruction corresponding to the address of the issue instruction set register 151 is fetched by the CPU 11 if the CPU 11 accesses any one address of the non-implementation space 42. Since the issue instruction set register 151 is allocated to all of the addresses of the non-implementation space 42, the runaway to the non-implementation space can be promptly detected.

The CPU 11 starts to execute a recovery program stored in the ROM 12 according to the acquired JUMP instruction or the TRAP instruction. The recovery program is a program for performing a recovering process in response to the runway having occurred. According to the recovery program, the CPU 11 performs an initializing process after reset and a returning process to the normal main routine if the register set 111 does not show an abnormal value, for example. Responding to the CPU 11 accessing to the non-implementation space, the CPU 11 is caused to start the recovery program, thereby allowing detection of runaway into the non-implementation space and execution of a proper recovery process to the runaway.

The above process causes the CPU to start the recovery program with a predetermined instruction. Alternatively, the instruction issue unit 15 may instruct the CPU 11 to start the recovery program by an interrupt signal to the CPU 11. The interrupt process dispenses with a register so that the circuit configuration can be simplified. In addition, it prevents troubles due to unexpected change of data in the register.

Figure 3:
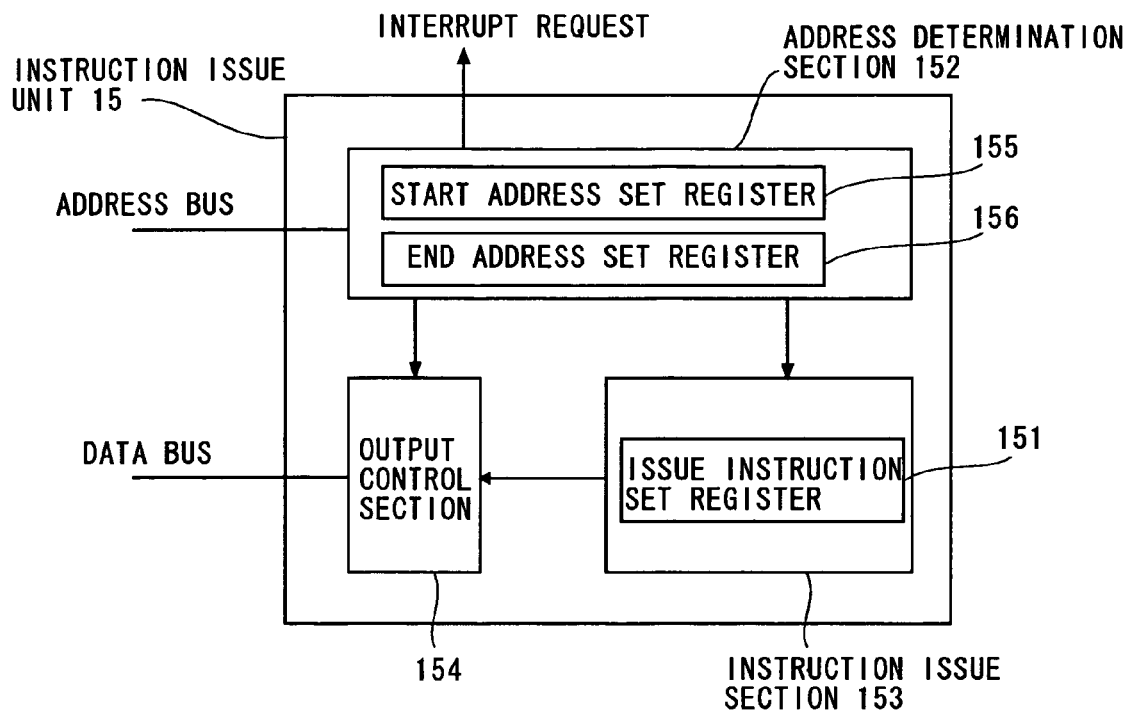
FIG. 3 is a block diagram schematically illustrating the instruction issue unit according to the first embodiment.

Now referring to FIG. 3, the instruction issue unit 15 is described in detail. FIG. 3 is a block diagram schematically showing the instruction issue unit 15. The instruction issue unit 15 comprises an address determination section 152 which determines an instruction fetch address of the CPU 11, an instruction issue section 153 which issues instructions to the CPU 11 based on the result of the determination by the address determination section 152, and an output control section 154 which controls output of an issue instruction from the instruction issue section 153. The instruction issue section 153 employs the issue instruction set register 151 which prestores the instruction set by a user.

Figure 4:
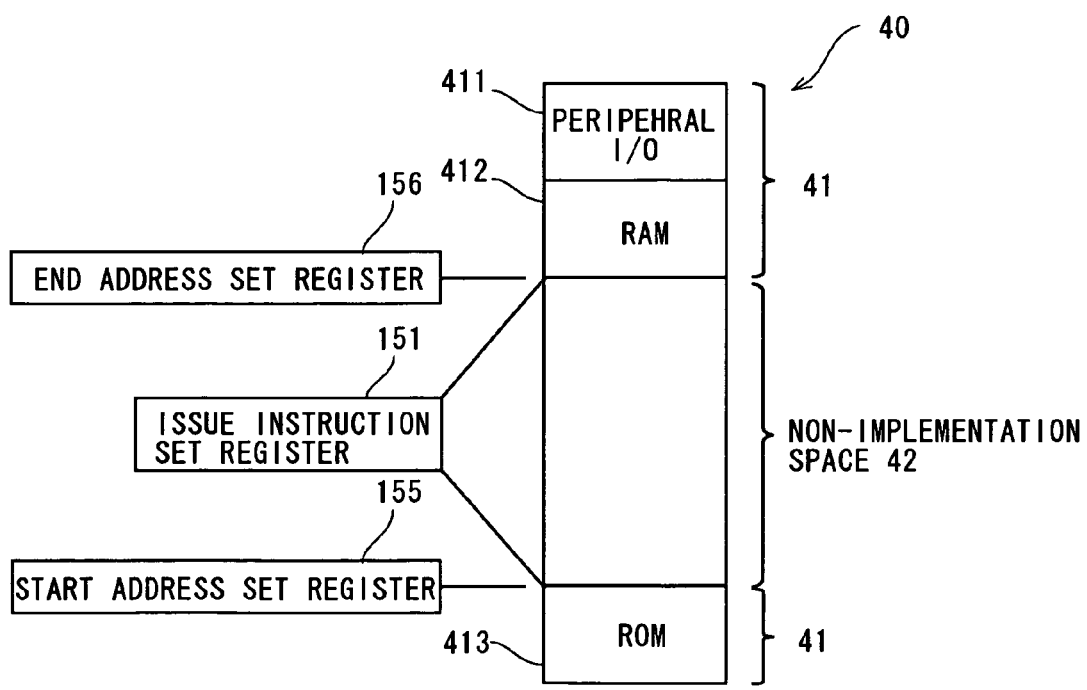
FIG. 4 is a drawing illustrating the mapping of the program space according to the first embodiment.
Figure 5:
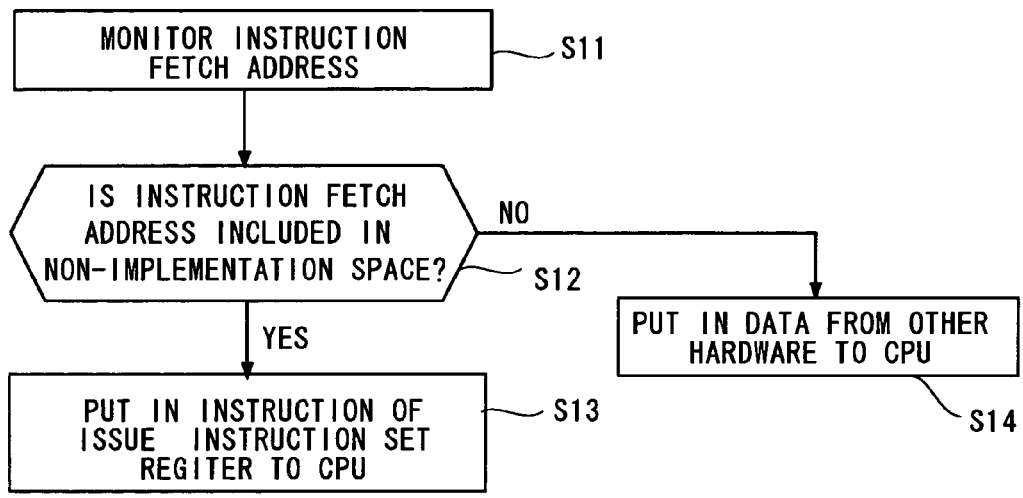
FIG. 5 is a flowchart showing the runaway detection according to the first embodiment.

The address determination section 152 comprises a start address set register 155 and an end address set register 156. As shown in FIG. 4, the start address set register 155 stores the start address of the non-implementation space and the end address set register 156 stores the end address of the non-implementation space. Referring to FIG. 5, the address determination section 152 monitors the addresses on the address bus (S11), compares the instruction fetch address of the CPU 11 with the addresses of the start address set register 155 and the end address set register 156, and determines whether the monitored addresses are included from the start address to the end address (S12).

Responding to the determination by the address determination section 152 that the address accessed by the CPU 11 is an address of the non-implementation space, the instruction issue section 153 outputs an instruction stored by the issue instruction set register 151 to the output control section 154, and the output control section 154 puts out the obtained instruction on the data bus (S13). The CPU 11 receives the instruction on the data bus and carries out the process according to the instruction. If the address determination section 152 determines that the address accessed by the CPU 11 is not an address of the non-implementation space, the output control section 154 does not put out data to the data bus but output data from different hardware is delivered over the data bus (S14).

In the present embodiment, the instruction issue unit 15 is formed outside of the CPU 11. However, the CPU 11, or the control section 112, may obtain the instruction from the register inside of the CPU 11 according to the program counter value if the similar function is implemented inside of the CPU 11. In the present embodiment, the instruction from the issue instruction set register starts the recovery process but an internal reset or a reset from the external circuit, i.e., an external reset, may cause the recovery process to start. In case of the external reset, the CPU 11 can put out the determination result of the address determination section 152 to the external portion to reset from the outside responding to the signal. Further, the present invention may be applied to any type of microprocessor such as an MPU, a peripheral LSI (MPR: Micro Peripheral Unit), a microcontroller and a DSP (Digital Signal Processor). In the present invention, the instruction is stored in the issue instruction set register, but the instruction may be stored in the ROM 12 or the RAM 13. These may be applied to the following embodiments as well.

Second Embodiment

Now referring to FIGS. 6 to 9, a microprocessor according to a second embodiment of the invention will be described. The microprocessor according to the present embodiment employs a different instruction issue unit from the one in the microprocessor 1 of the first embodiment and the other configuration is substantially the same. Therefore, in the present embodiment, the configuration of the instruction issue unit will be described and the explanation of the other part will be omitted. The instruction issue unit according to the present embodiment includes a plurality of issue instruction set registers, and they correspond to segments in the non-implementation space, respectively. Thereby, it is possible to set different recovery programs corresponding to the addresses where runaway occurs.

Figure 6:
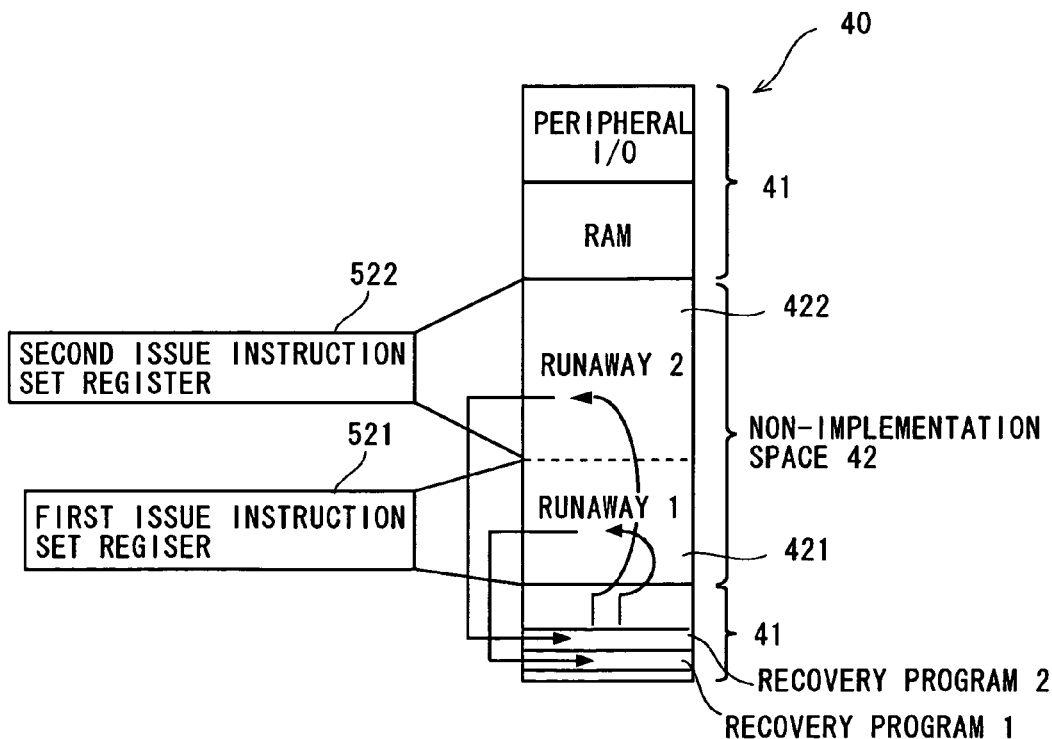
FIG. 6 is a drawing illustrating the mapping of the program space of the CPU and runaway detection by the instruction issue unit according to the second embodiment.

FIG. 6 illustrates the mapping of the program space 40 of the CPU and runaway detection by the instruction issue unit according to the present embodiment. As described above, the instruction issue unit of the present embodiment comprises a plurality of issue instruction set registers. In FIG. 6, two issue instruction set registers, i.e., a first issue instruction set register 521 and a second issue instruction set register 522, are illustrated. The non-implementation space 42 is divided into two segments and the first segment 421 and the second segment 422 correspond to the first issue instruction set register 521 and the second issue instruction set register 522, respectively.

A same instruction or different instructions can be set in the first and second issue instruction set registers 521 and 522. Preferably, as shown in FIG. 6, instructions are set to respective issue instruction set registers 521 and 522 in order for the CPU 11 to execute different recovery programs according to the segments. The instruction to be set may be a JUMP instruction or a TRAP instruction as in the first embodiment. In the example of FIG. 6, the CPU 11 starts the execution of the first recovery program in case of the runaway into the first segment 421 and the second recovery program in case of the runaway into the second segment 422.

The first issue instruction set register 521 is allocated to all of the addresses of the first segment 421 and the second issue instruction set register 522 is allocated to all of the addresses of the second segment 422. Therefore, if the program execution of the CPU 11 runs away into any address of the first segment 421, the instruction stored in the first issue instruction set register 521 is fetched by the CPU 11. On the other hand, if the program execution of the CPU 11 runs away into any address of the second segment 422, the instruction stored in the second issue instruction set register 522 is fetched by the CPU 11. The CPU 11 starts the first or second recovery program according to the fetched instruction.

Alternatively, an interrupt request instead of the instruction can direct the CPU 11 to execute a predetermined program. The instruction issue unit 50 sends an interrupt request of which the number varies with segments to the CPU 11. The CPU 11 carries out the interrupt process according to the interrupt number. Thus, the instruction issue unit 50 can direct the CPU 11 to carry out different recovery processes according to the addresses where the runaway occurs.

Figure 7:
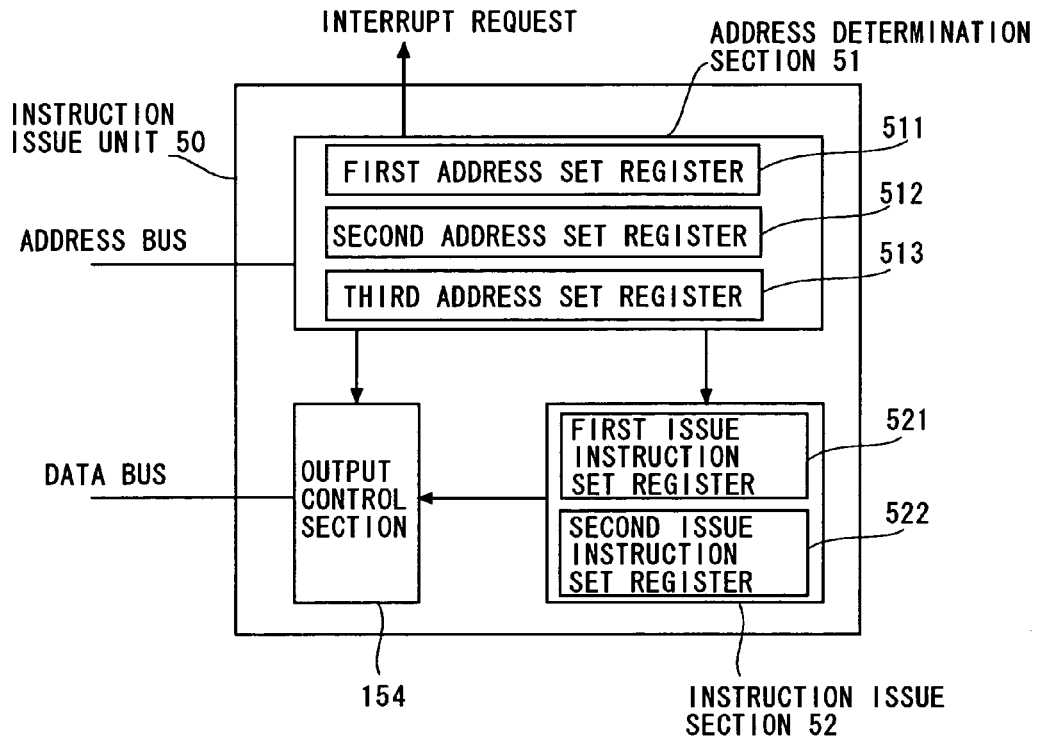
FIG. 7 is a block diagram schematically illustrating the instruction issue unit according to the second embodiment.
Figure 8:
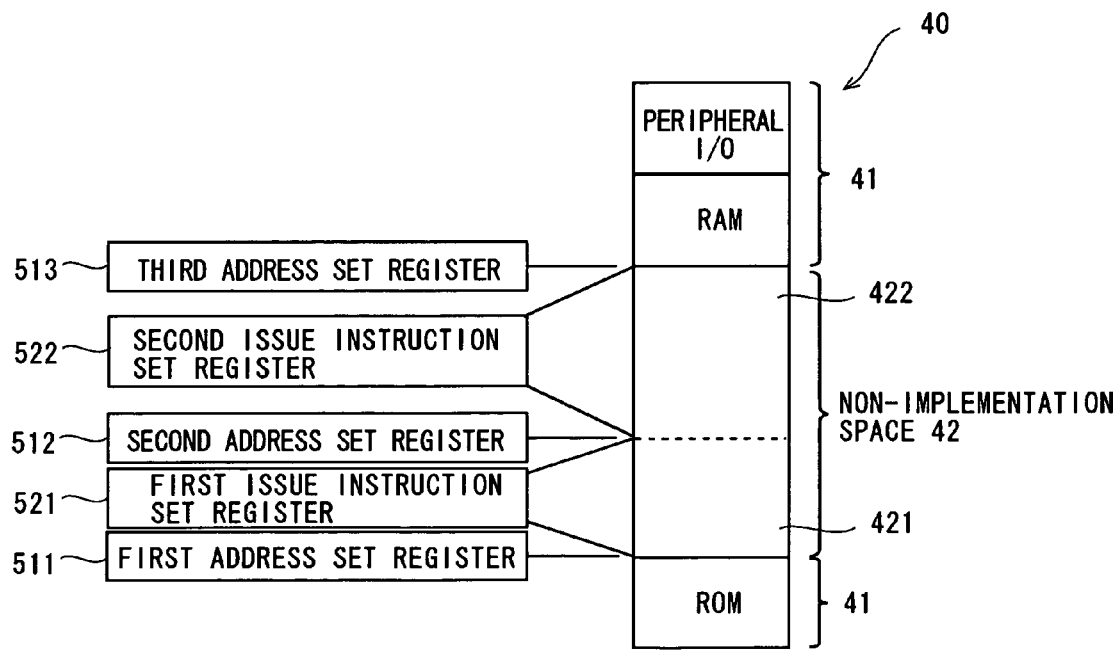
FIG. 8 is a drawing illustrating the mapping of the program space according to the second embodiment.

FIG. 7 is a block diagram schematically showing the instruction issue unit 50 according to the present invention. The instruction issue unit 50 comprises an address determination section 51, an instruction issue section 52 and an output control section 154. The output control section 154 has already been described in the first embodiment and the description herein is skipped. The address determination section 51 of the present embodiment comprises three address set registers, i.e., the first, the second and the third address set registers 511, 512 and 513. As shown in the memory map of FIG. 8, the first address set register 511 stores the start address of the first segment 421, the second address set register 512 stores the end address of the first segment 422, which corresponds to the start address of the second segment, and the third address set register 513 stores the end address of the second segment 422.

The instruction issue section 52 comprises the first and the second issue instruction set registers 521 and 522. The instructions prestored in the issue instruction set registers 521 and 522 are as described above, e.g., a JUMP instruction or a TRAP instruction to invoke the first or the second recovery program.

Figure 9:
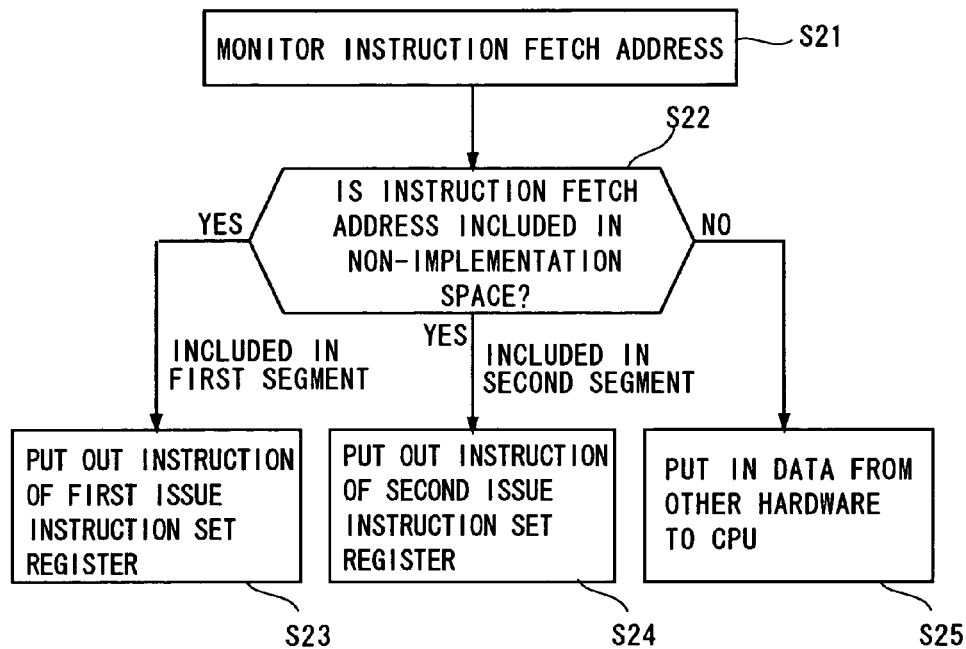
FIG. 9 is a flowchart showing the runaway detection according to the second embodiment.

Referring to FIG. 9, the address determination section 51 monitors the instruction fetch address which the CPU 11 puts on the address bus (S21), and determines whether or not the instruction fetch address is included in the non-implementation space 42. Specifically, the address determination section 51 obtains the instruction fetch address on the address bus, compares it with the address values stored in the address set registers 511, 512 and 513, and determines whether or not the instruction fetch address accessed to the first segment 421 or the second segment 422 of the non-implementation space 42 (S22). If the instruction fetch address coincides with the value of the second address set register 512, it is determined that it accessed the first segment 412 or the second segment 422.

If the address determination section 51 determines that the instruction fetch address is included in the first segment 421, the instruction issue section 52 sends a predetermined instruction in the first issue instruction set register 521 to the output control section 154 (S23). If the address determination section 51 determines that the instruction fetch address coincides with any one of the addresses in the non-implementation space, the output control section 154 puts out the instruction obtained from the instruction issue section 52 onto the data bus. The CPU 11 obtains the instruction on the data bus and thereby starts the first recovery program.

If the address determination section 51 determines that the instruction fetch address from the CPU 11 is included in the second segment 422, the instruction issue section 52 sends a predetermined instruction in the second issue instruction set register 522 to the output control section 154 (S24). If the address determination section 51 determines that the instruction fetch address coincides with any one of the addresses in the non-implementation space, the output control section 154 puts out the instruction obtained from the instruction issue section 52 onto the data bus. The CPU 11 obtains the instruction on the data bus and thereby starts the second recovery program.

If the address determination section 51 determines that the instruction fetch address is not included in the non-implementation space, i.e., the instruction fetch address is included in neither the first segment 421 nor the second segment 422, the output control section 154 does not put out data onto the data bus but data from other hardware is put out onto the data bus (S25). According to the present embodiment, a plurality of issue instruction set registers allocated to the segments in the non-implementation space allow to issue instructions corresponding to the segments to the CPU 11. Especially, different recovery processes can be selected according to the addresses of the non-implementation space.

Although the non-implementation space is divided into two segments in the above example, it may be divided into three or more segments. Also, the present embodiment provides an example that the continuous non-implementation space is divided into two segments, but even if the non-implementation space is configured with distant areas, it can be divided into a plurality of segments to be controlled. A segment may consist of one address. One issue instruction set register may be allocated to a plurality of different segments. An instruction or interrupt request can be chosen to be used according to the segments, for example, the instruction may be used for the first segment and the interrupt request may be used for the second segment.

In the present embodiment, all of the addresses of the non-implementation space are allocated to the issue instruction set registers, but a part of addresses in the non-implementation space may not be allocated to the issue instruction set registers and another selected part of the addresses of non-implementation space may be allocated to the issue instruction set registers. For example, the non-implementation space is divided into three segments, and the two of them are allocated to different issue instruction set registers respectively and the other one is not allocated to the issue instruction set register.

Third Embodiment

Now referring to FIGS. 10 to 13, a microprocessor according to a third embodiment of the invention will be described. The microprocessor according to the present embodiment employs a different instruction issue unit from the one in the microprocessor 1 of the second embodiment and the other configuration is substantially the same. Therefore, in the present embodiment, the configuration of the instruction issue unit will be described and the explanation of the other part will be omitted. Although the instruction issue unit according to the present embodiment includes a plurality of issue instruction set registers as in the second embodiment, they correspond to addresses in the non-implementation space, respectively. Thereby, it is possible to set different recovery programs corresponding to the addresses where runaway occurs.

Figure 10:
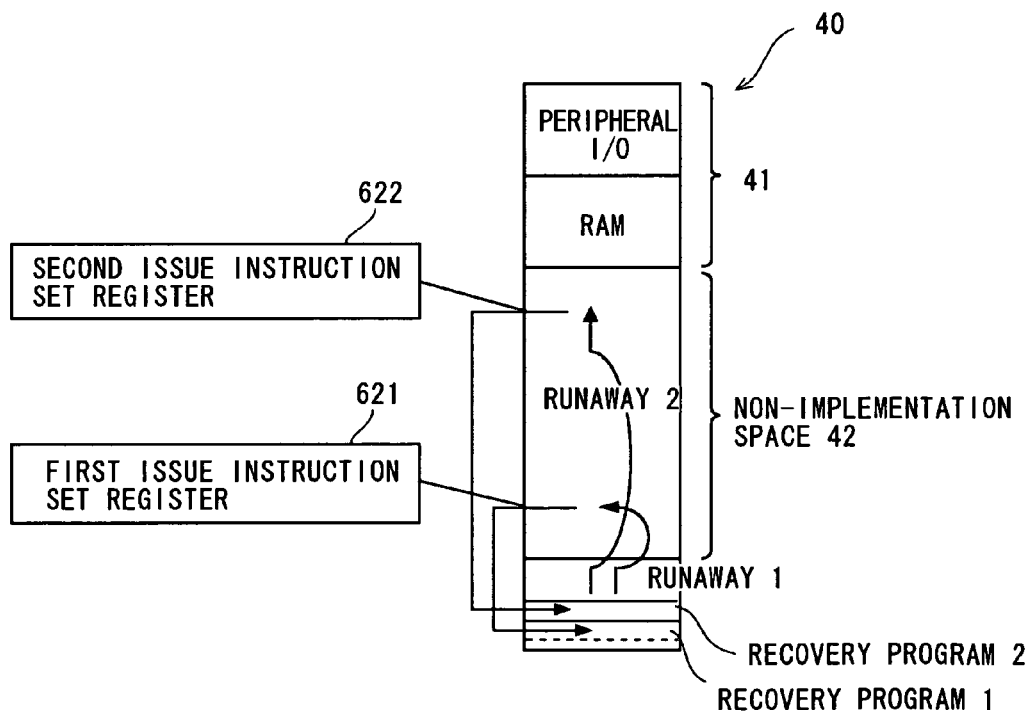
FIG. 10 is a drawing illustrating the mapping of the program space of the CPU and runaway detection by the instruction issue unit according to the third embodiment.

FIG. 10 illustrates the mapping of the program space 40 of the CPU and runaway detection by the instruction issue unit according to the present embodiment. As described above, the instruction issue unit of the present embodiment comprises a plurality of issue instruction set registers. In FIG. 10, two issue instruction set registers, i.e., a first issue instruction set register 621 and a second issue instruction set register 622, are illustrated. The first and second issue instruction set registers 621 and 622 correspond to the first and the second addresses of the non-implementation space 42, respectively.

A same instruction or different instructions can be set in the first and second issue instruction set registers 621 and 622. Preferably, as shown in FIG. 10, instructions are set to each issue instruction set register 621 and 622 in order for the CPU 11 to execute different recovery programs according to the addresses. The instruction to be set may be a JUMP instruction or a TRAP instruction as in the second embodiment. In the example of FIG. 10, the CPU 11 starts the execution of the first recovery program if the first address is accessed due to runaway, and the second recovery program if the second address is accessed due to runaway. As in the second embodiment, an interrupt request instead of the instruction can direct the CPU 11 to execute a predetermined program. The instruction issue unit provides a different number of interrupt requests corresponding to the addresses to the CPU 11.

Figure 11:
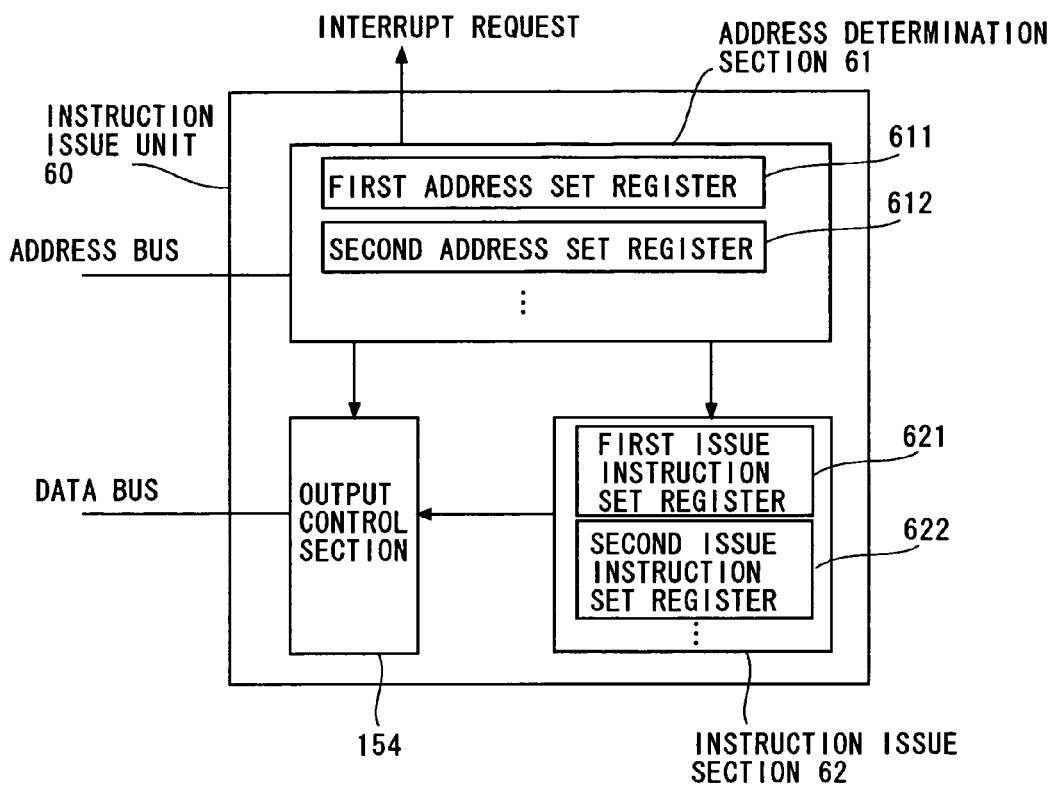
FIG. 11 is a block diagram schematically illustrating the instruction issue unit according to the third embodiment.
Figure 12:
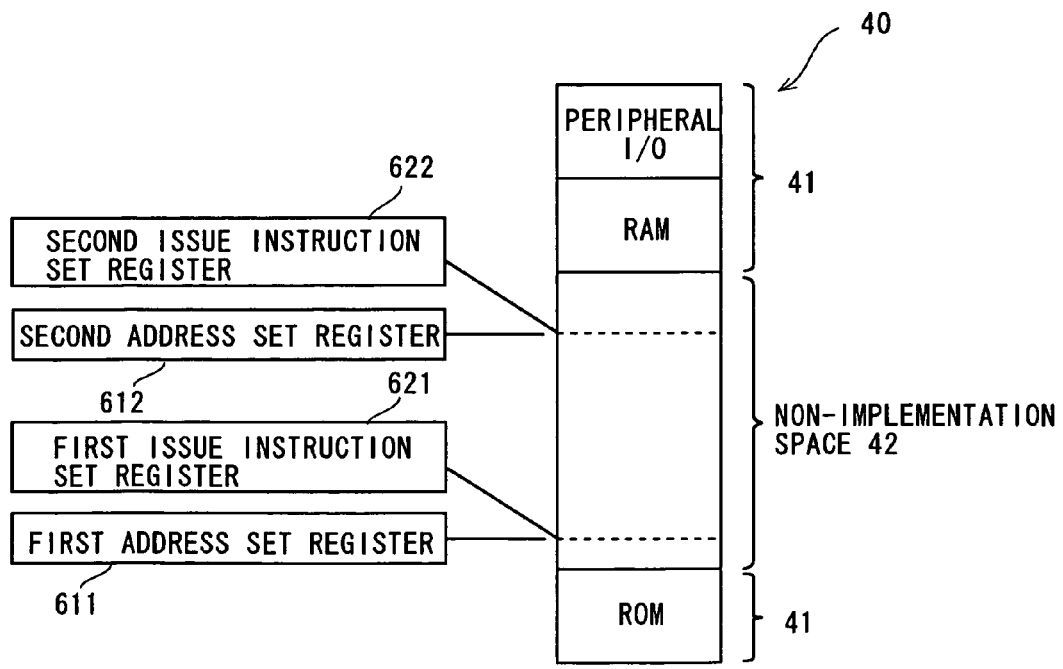
FIG. 12 is a drawing illustrating the mapping of the program space according to the third embodiment.

FIG. 11 is a block diagram schematically showing the instruction issue unit 60 according to the present embodiment. The instruction issue unit 60 comprises an address determination section 61, an instruction issue section 62 and an output control section 154. The output control section 154 has already been described in the first embodiment and the description herein is skipped. The address determination section 61 of the present embodiment comprises two address set registers, i.e., the first and the second address set registers 611 and 612. As shown in the memory map of FIG. 12, the first address set register 611 stores the first address of the non-implementation space and the second address set register 612 stores the second address of the non-implementation space.

The instruction issue section 62 comprises the first and the second issue instruction set registers 621 and 622. The instructions prestored in the issue instruction set registers 621 and 622 are as described above, e.g., a JUMP instruction or a TRAP instruction to invoke the first or the second recovery program.

Figure 13:
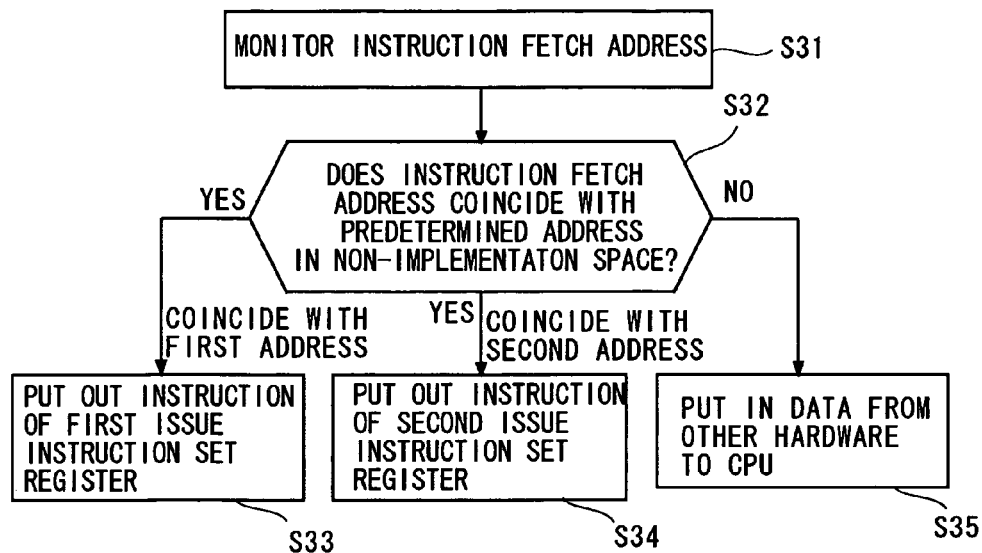
FIG. 13 is a flowchart showing the runaway detection according to the third embodiment.

Referring to FIG. 13, the address determination section 61 monitors the instruction fetch address which the CPU 11 puts on the address bus (S31), and determines whether or not the instruction fetch address coincides with the predetermined address in the non-implementation space 42 (S32). Specifically, the address determination section 61 obtains the instruction fetch address on the address bus, compares it with the address values stored in the address set registers 611 and 612. If the address determination section 61 determines that the instruction fetch address coincides with the first address, the instruction issue section 62 sends a predetermined instruction in the first issue instruction set register 621 to the output control section 154 (S33). Responding to the determination of the address determination section 61 that the instruction fetch address coincides with the first address, the output control section 154 puts out the instruction obtained from the instruction issue section 62 onto the data bus. The CPU 11 obtains the instruction on the data bus and thereby starts the first recovery program.

If the address determination section 61 determines that the instruction fetch address coincides with the second address, the instruction issue section 62 sends a predetermined instruction in the second issue instruction set register 622 to the output control section 154 (S34). Responding the determination of the address determination section 61 that the instruction fetch address coincides with the second address, the output control section 154 puts out the instruction obtained from the instruction issue section 62 onto the data bus. The CPU 11 obtains the instruction on the data bus and thereby starts the second recovery program.

If the address determination section 61 determines that the instruction fetch address coincides with neither the first nor the second segment addresses, the output control section 154 does not put out data onto the data bus and other hardware puts out data onto the data bus (S35). If the CPU 11 accesses any address in the non-implementation space but different from the first and the second addresses due to runaway, non-branch instructions, such as AND, OR or NOP instructions, which are executed sequentially to follow the addresses without branching are put out on the data bus. These non-branch instructions are put out onto the data bus due to the instruction issue section or other circuit configuration. As described above, in the present embodiment, employing the plurality of issue instruction set registers corresponding to the non-implementation causes to issue appropriate instructions corresponding to the addresses to the CPU 11. Especially, different recovery programs can be selected according to the addresses of the non-implementation space.

Although the present embodiment employs the two addresses, more than three addresses may correspond to the issue instruction set register. One issue instruction set register may correspond to a plurality of different addresses. An instruction or an interrupt request may be chosen for use, for example, an instruction can be used in the first address and an interrupt request can be used in the second address.

Other Embodiments

Figure 14:
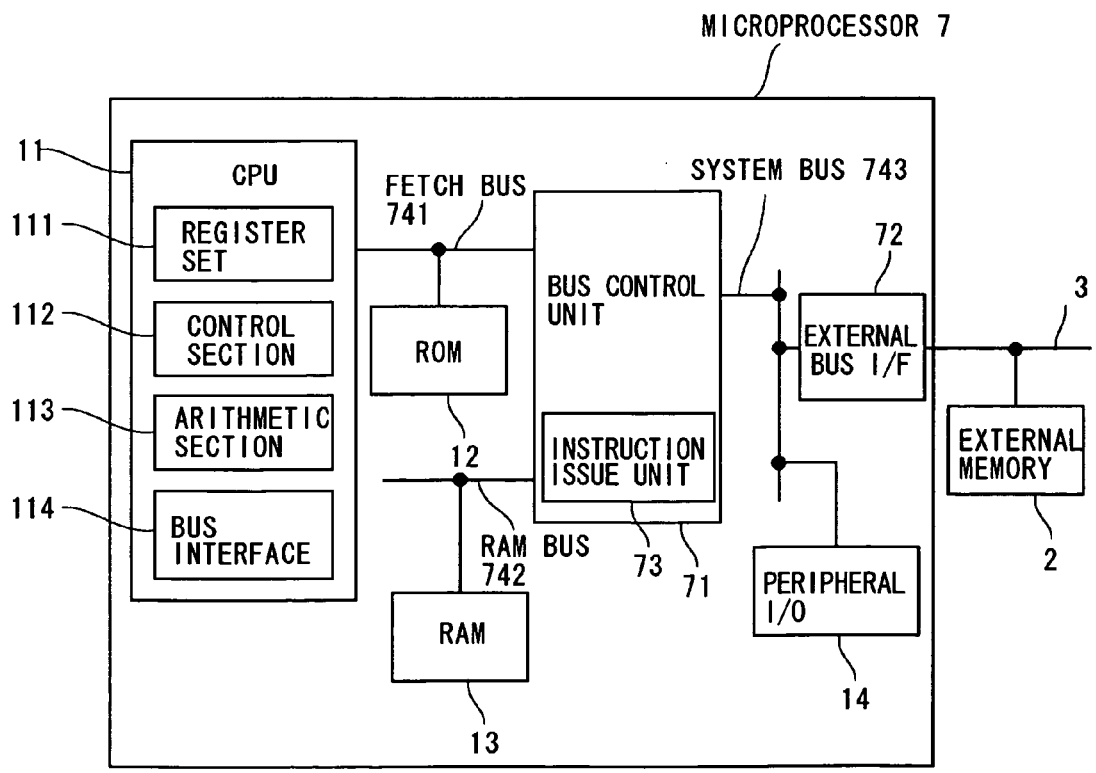
FIG. 14 is a block diagram schematically illustrating a microprocessor according to the other embodiment.
Figure 15:
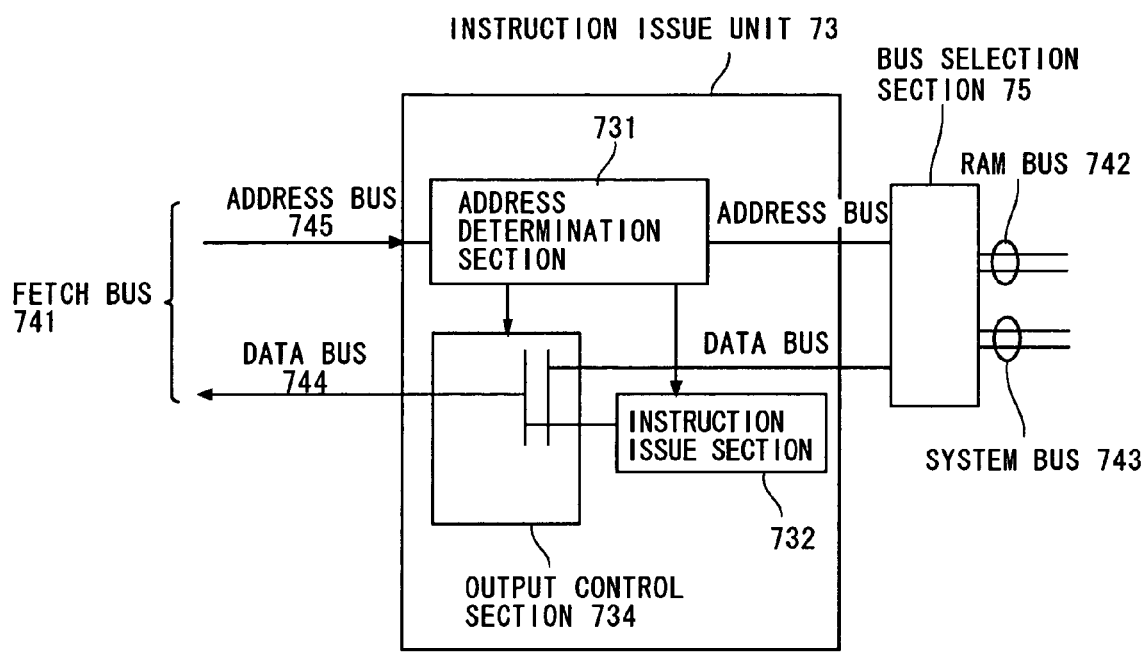
FIG. 15 is a block diagram schematically illustrating an instruction issue unit according to the other embodiment.

Now referring to FIGS. 14 and 15, a microprocessor according to another embodiment of the present invention will de described. The microprocessor is different from the microprocessor 1 of the first embodiment, and each bus configuration is independent and the buses are controlled by a bus control unit. An instruction issue unit is embedded in the bus control unit.

FIG. 14 is a block diagram schematically illustrating the microprocessor 7 of the present embodiment. The microprocessor 7 comprises a bus control unit 71 which controls buses and an external bus interface 72 which interfaces the external buses as well as a CPU 11, a ROM 12, a RAM 13 and a peripheral I/O 14. The instruction issue unit 73 is embedded in the bus control unit 71. The configurations of the CPU 11, the ROM 12, the RAM 13 and the peripheral I/O 14 are substantially same as the other embodiments described above, the explanations thereof are omitted herein.

The CPU 11 and the ROM 12 are connected to a fetch bus 741 and the RAM 13 is connected to a RAM bus 742. The external bus I/F 72 is connected to a system bus 743 and an external bus 3. The bus control unit 71 is connected to all of the internal busses, i.e., the fetch bus 741, the RAM bus 742 and the system bus 743.

FIG. 15 is a block diagram schematically illustrating the instruction issue unit 73. The instruction issue unit 73 comprises an address determination section 731, an instruction issue section 732 and an output control section 734. Detailed description about each configurations of the address determination section 731 and the instruction issue section 732 is omitted because they may be same as in the above-described embodiments.

The output control section 734 controls the output of the fetch bus 741 to the data bus 744 based on the determination result about the address of the address determination section 731. The output-control section 734 is connected to the instruction issue section 732 and the bus selection section 75. The bus selection section 75 selects the internal bus to be connected to the data bus 744 from the RAM bus 742 and the system bus 743 according to the addresses of the address bus 745 of the fetch bus.

The output control section 734 comprises a selector and provides an output from the instruction issue section 732 or from the bus selection section 75, i.e. the internal bus, selectively to the fetch bus 741 according to the result of determination of the address determination section 731. If the address is an address where the instruction issue section 732 operates, the output control section 734 selects the output from the instruction issue section 732 and puts out data on the data bus 744 of the fetch bus. In case of the other addresses, the output control section 734 selects the output from the bus selection section 75 and interfaces the RAM bus 742 or the system bus 743 and the data bus 744 of the fetch bus.

It is apparent that the present invention is not limited to the above embodiment and it may be modified and changed without departing from the scope and spirit of the invention.

What is claimed is:

1. A semiconductor circuit device for detecting runaway of program execution in a processor comprising:
    a processor executing a process according to a program;
    an address determination section determining an address of a program space accessed by the processor;
    an instruction section outputting a predetermined recovery program in response to a determination by said address determination section; and
    an output control section selecting one of a result accessed by the address and the predetermined recovery program in response to the determination of the address determination section, and outputting the selected one to the processor,
    wherein the output control section selects the predetermined recovery program when the address determination section determines that the address is a non-implementation space,
    wherein the address determination section determines whether the processor has accessed addresses in a part of the non-implementation space, and
    wherein a non-branching instruction is put out to the processor if the processor has accessed to an address in the non-implementation space outside of the part of the non-implementation space.

2. The semiconductor circuit device according to claim 1, wherein
    the address determination section determines whether the processor has accessed any of all of the addresses in the non-implementation space, and
    the instruction section outputting the predetermined program in response to the determination of the address determination section that the processor has accessed any of the addresses in the non-implementation space.

3. The semiconductor circuit device according to claim 1, wherein the instruction section outputs an interrupt request as the predetermined recovery program.

4. The semiconductor circuit device according to claim 1, wherein the instruction section further comprises a register allocated to one or more of addresses in the non-implementation space, and provides an instruction stored in the register to the processor in response to the determination of the address determination section that the processor has accessed the one or more addresses.

5. The semiconductor circuit device according to claim 4, wherein the register is allocated to all of the addresses in the non-implementation space.

6. The semiconductor circuit device according to claim 1, wherein
    the non-implementation space comprises a plurality of segments,
    the instruction section comprises a plurality of registers each of which stores a predetermined recovery program, each of the plurality of segments is allocated to one of the plurality of registers, and
    the instruction section provides the processor with an instruction stored in the register corresponding to the address which the processor has accessed.

7. A runaway detection method for detecting runaway of program execution in a processor which carries out processes according to a program comprising:
    determining an address of a program space accessed by the processor,
    determining whether the address is in a first part of a non-implementation space of the program space or a second part thereof that is separate from the first part,
    carrying out a predetermined recovery process in response to a determination that the address is in the first part of the non-implementation space, and
    sending a non-branching instruction to the processor in response to the determination that the address is in the second part of the non-implementation space.

8. The runaway detection method according to claim 7, wherein it is determined that the processor has accessed the first part of the non-implementation space if any one address of the first part of the non-implementation space has been accessed.

9. The runaway detection method according to claim 7, wherein
    the processor is instructed to invoke a predetermined recovery program in response to a determination that the first part of the non-implementation space has been accessed, and
    the predetermined recovery program execution is started in the processor in response to the instruction.

10. The runaway detection method according to claim 9, wherein
    the processor is instructed to invoke the recovery program by an instruction corresponding to the accessed address in the first part of the non-implementation space, and
    the recovery program indicated by the instruction started in the processor.

11. The runaway detection method according to claim 10, wherein the instruction is allocated to a plurality of addresses in the first part of the non-implementation space.

12. The runaway detection method according to claim 9, wherein
    all addresses in the first part of the non-implementation space are allocated to one or more instructions,
    an instruction corresponding to the accessed address in the first part of the non-implementation space instructs the processor to invoke the recovery program, and
    the recovery program indicated in the instruction is started in the processor.

13. The runaway detection method according to claim 9, wherein the processor is instructed to invoke the predetermined recovery program by an interrupt request.

* * * * *